US006685161B2

(12) United States Patent
Moser

(10) Patent No.: US 6,685,161 B2
(45) Date of Patent: Feb. 3, 2004

(54) PULL TYPE SOLENOID WITH HIGH FORCE

(75) Inventor: Paul D. Moser, Peoria, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 10/161,462

(22) Filed: May 31, 2002

(65) Prior Publication Data

US 2002/0190235 A1 Dec. 19, 2002

Related U.S. Application Data

(63) Continuation-in-part of application No. 09/677,690, filed on Oct. 2, 2000, now abandoned.

(51) Int. Cl.$^7$ .............................................. F16K 31/02
(52) U.S. Cl. ............................... 251/129.18; 251/129.15
(58) Field of Search ....................... 251/129.15, 129.18, 251/129.19

(56) References Cited

U.S. PATENT DOCUMENTS

| 4,267,897 A | 5/1981 | Takeshima |
| 4,450,423 A | 5/1984 | Morishita |
| 4,463,332 A | 7/1984 | Everett |
| 4,560,967 A | 12/1985 | Lindsey |
| 4,635,683 A | 1/1987 | Nielsen |
| 4,766,405 A | 8/1988 | Daly et al. |
| 4,988,074 A | 1/1991 | Najmolhoda |
| 5,370,450 A | 12/1994 | Volz et al. |
| 5,513,832 A | 5/1996 | Becker et al. |
| 5,785,298 A | 7/1998 | Kumar |
| 5,947,442 A | 9/1999 | Shurman et al. |
| 5,996,628 A | 12/1999 | Najmolhoda et al. |
| 6,029,682 A | 2/2000 | Lewis et al. |
| 6,053,473 A | 4/2000 | Shinobu et al. |
| 6,109,541 A | 8/2000 | Beatty et al. |

OTHER PUBLICATIONS

Parent Specification Pull Type Solenoid With High Force, Application No. 09/677,690, filed Oct. 2, 2000.

Primary Examiner—Kevin Shaver
Assistant Examiner—David A Bonderer
(74) Attorney, Agent, or Firm—Steve M Hanley

(57) ABSTRACT

A solenoid actuated valve assembly includes a valve assembly including at least a moveable valving element and a solenoid assembly including an armature. The solenoid assembly is operative to move the armature in response to electrical activation of the solenoid assembly wherein the armature is independently moveable relative to the valving element and the valving element is in tracking engagement with the armature. The valving element is not retained by the solenoid assembly.

8 Claims, 1 Drawing Sheet

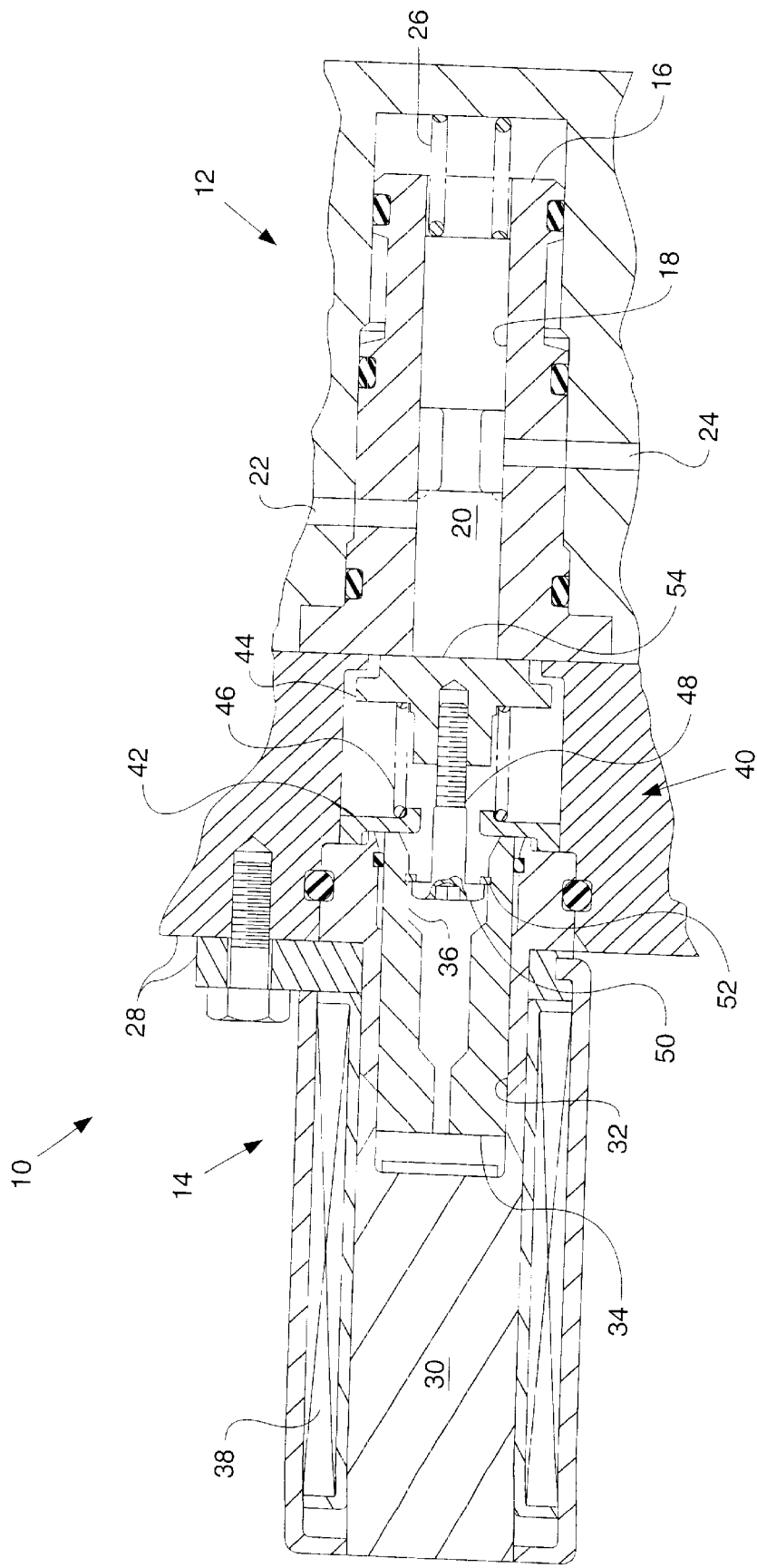

PULL TYPE SOLENOID WITH HIGH FORCE

This application is a continuation-in-part of application Ser. No. 09/677,690, filed Oct. 2, 2000 now abandoned.

TECHNICAL FIELD

This invention relates to a proportional solenoid and more particularly to a pull type proportional solenoid with high force capabilities.

BACKGROUND

In a typical solenoid valve assembly, the solenoid subassembly has an armature which acts on, or is coupled to, a valve member in the valve subassembly. As is known, movement of the armature is responsive to the magnetic flux generated as a result of the electrical current applied to the electromagnetic windings of the solenoid sub-assembly. Thus linear movement of the armature causes corresponding linear movement of the valve member which controls the flow of fluid through the valve. When the armature of the solenoid is connected firmly to the valve member any misalignment therebetween results in loss of operating efficiency. In many different types of solenoids, the overall force being generated by the solenoid is adversely affected by cavities or other voids which typically house springs or the like. One such arrangement is shown in U.S. Pat. No. 5,513,832, issued May 7, 1996 and is assigned to Lectron Products, Inc. In the subject patent, a spring cavity is disposed within the armature 64 and results in the reluctance increasing thus causing the magnetic flux path to degrade thus lessening the maximum operating force output from the solenoid.

The present invention is directed to overcoming one or more of the problems as set forth above.

SUMMARY OF THE INVENTION

In an aspect of the present invention a solenoid actuated valve assembly includes a valve assembly including at least a moveable valving element; and a solenoid assembly including an armature. The solenoid assembly is operative to move the armature in response to electrical activation of the solenoid assembly wherein the armature is independently moveable relative to the valving element and the valving element is in tracking engagement with the armature. The valving element is not retained by the solenoid assembly.

The present invention further provides a method of controlling flow through a valve assembly using an electrically activated solenoid assembly, the method including causing movement of armature along a path defined by the solenoid assembly; causing a valving element within the valve assembly to move in a path defined by the valving assembly in response to the activation of the solenoid assembly, the path defined by the solenoid assembly including all paths except a path in alignment with the path defined by the valving assembly; and urging the valving element in abutment with the solenoid assembly to cause a tracking relationship between the armature and the valving element.

BRIEF DESCRIPTION OF THE DRAWINGS

The sole drawing is a diagrammatic representation of a proportionally controlled, solenoid actuated valve assembly incorporating the subject invention.

DETAILED DESCRIPTION

Referring to the drawing a proportionally controlled, solenoid actuated valve assembly 10 is illustrated and includes a valve assembly 12 and a pull type solenoid assembly 14. The valve assembly 12 includes a housing 16 having a bore 18 defined therein. A valving element 20 is selectively, slideably disposed within the bore 18 to control fluid flow between first and second fluid ports 22,24. The valving element 20 is biased in one direction by a spring 26.

The pull type solenoid assembly 14 includes a solenoid housing 28 having a coil core 30 with a bore 32 defined therein adjacent one end of the coil core 30. An armature 34 is slideably defined within the bore 32. A bore 36 is defined in one end of the armature 34 adjacent the one end of the coil core 30. An electrical wire coil assembly 38 encircles the coil core 30 and is selectively connected to a source of electrical energy (not shown) by an electrical line 39.

A spring assembly 40 is disposed adjacent to and in abutment with the one end of the coil core 30. The spring assembly 40 includes a first retainer member 42, a second retainer member 44, a spring 46 disposed therebetween, and a connector member 48 adjustably secured to the second retainer member 44 and extends through the first retainer member 42. The connector member 48 has a head portion 50 that extends into the bore 36 of the armature 34 and is loosely secured therein by a locking member 52. During the assembly of the spring assembly 40 to the armature 34, the connector member 48 is adjusted to maintain a predetermined force on the spring 46 between the first and second retainer members 42,44.

The second retainer member 44 has a flat face 54 on the side thereof opposite the side in contact with the spring 46. When assembled with the valve assembly 12, the flat face 54 is in direct abutting contact with the end of the valving element that is opposite to the end in contact with the spring 26. This arrangement permits varying degrees of misalignment between the valving element 20 and the spring assembly 40 thus eliminating any binding therebetween.

It is recognized that various arrangements could be utilized without departing from the essence of the subject invention. For instance, the solenoid housing 28 could be a divider member in abutting contact with the housing 16 and the pull type solenoid assembly 14 with the attached spring assembly 40 being disposed within the divider member.

As is known, solenoid-operated fluid control devices are used in a wide range of electrically controlled systems for controlling the pressure and/or flow rate of fluid discharged from a source of pressurized fluid or a valve assembly in response to an electrical input signal supplied to a solenoid assembly. In many applications, a valve sub-assembly and a solenoid sub-assembly are integrated into a unitized fluid control device, commonly referred to as a solenoid valve assembly.

INDUSTRIAL APPLICABILITY

In the operation of the pull type solenoid assembly disclosed in the drawing, the valving element 20 is spring biased by the spring 26 to its flow blocking position in the absence of an electrical signal through the electrical line 39 to the pull type solenoid assembly 14. With no electrical signal to the pull type solenoid assembly 14, the armature 34 is maintained at its rightmost position, as viewed in the drawing. The armature is held in the rightmost position by the spring assembly 40. Likewise, the valving element 20 is maintained at its flow blocking position by the spring assembly 40, since the valving element 20 is in abutment with the second retainer member 44 of the spring assembly 40.

Upon the introduction of an electrical signal through the electrical line 39 to the pull type solenoid assembly 14, a magnetic field is established by the electrical wire coil and the coil core 30. The magnetic field acts against the bias of the spring assembly 40 to urge the armature 34 in a leftward direction as viewed in the drawing. The magnitude of the movement of the armature 34 is proportional to the magnitude of the electrical signal.

Due to the connector member 48 being connected to the armature 34, movement of the armature 34 in the leftward direction also moves the second retainer member 44 in the leftward direction. The valving element 20 follows or "tracks" the movement of the second retainer member 44 since the spring 26 is acting to urge the valving element 20 in the leftward direction. By increasing the electrical signal through the electrical line 39, the armature 34 is moved further in the leftward direction thus causing the valving element 20 to move further to the left. As the valving element 20 is moved towards the left as viewed in the drawing, the first fluid port 22 is controllably communicated with the second fluid port 24. The greater the leftward movement of the valving member 20 the greater the degree of communication between the first and second fluid ports. By increasing or decreasing the electrical signal to the pull type solenoid assembly 14, the communication of the first and second fluid ports 22,24 is selectively controlled.

In view of the foregoing, it is readily apparent that the structure of the present invention provides a proportionally controlled solenoid actuated valve 10 that eliminates any voids or holes within the pull type solenoid assembly that would detract from the magnetic efficiency thereof. The subject invention also eliminates plugs and/or seals at the end of the solenoid assembly that is normally required and also eliminates any misalignment problems between the valving element and the armature of the solenoid assembly.

Other aspects, objects and advantages of this invention can be obtained from a study of the drawings, the disclosure and the appended claims.

What is claimed is:

1. A solenoid actuated valve assembly comprising:
   a valve assembly including at least a moveable valving element, the valving element including a face portion; and
   a solenoid assembly including an armature, the armature including a face portion, said solenoid assembly being operative to move the armature in response to electrical activation of the solenoid assembly,
   wherein said armature being independently moveable relative the valving element and the valving element being urged to move in tracking relation relative to movement of the armature through an abutment between the face portion of the valving element and the face portion of the armature, wherein the abutment being structured and arranged such that the valving element is not retained by the solenoid assembly.

2. The solenoid actuated valve assembly of claim 1, wherein the solenoid assembly further comprises: a solenoid housing and a retainer member, said solenoid housing is configured to overlay said valve assembly, said armature is in contact with said valving element through said retainer member.

3. The solenoid actuated valve assembly of claim 2, wherein said retainer is independently moveable relative said valving element along an interface between said valving element and said retainer.

4. The solenoid actuated valve assembly of claim 2, wherein the solenoid assembly further comprises: a connector member connected to the armature and the retainer, said connector member is adapted to adjustably change the distance between the retainer and the armature.

5. The solenoid actuated valve assembly of claim 4, wherein the solenoid assembly further comprises: a spring disposed between the retainer and the armature to affect a predetermined force on the valving element through the retainer.

6. The solenoid actuated valve assembly of claim 1, wherein the valve assembly further comprises a housing having a bore therein, said valving element being slideably disposed in said bore.

7. The solenoid actuated valve assembly of claim 1, wherein the valve assembly includes an inlet port and an outlet port, said valving element is moveable in response to movement of the armature to urge fluid communication between said inlet and outlet ports.

8. The solenoid actuated valve assembly of claim 7, wherein the solenoid assembly further comprises: an electrical wire coil assembly and a coil core, the electrical wire coil assembly and the coil core are operative to urge movement of the armature in response to electrical activation of the electrical wire coil assembly.

\* \* \* \* \*